(12) United States Patent
Hosokawa et al.

(10) Patent No.: US 10,185,165 B2
(45) Date of Patent: Jan. 22, 2019

(54) OPTICAL WAVEGUIDE DEVICE

(71) Applicant: Sumitomo Osaka Cement Co., Ltd, Tokyo (JP)

(72) Inventors: Youichi Hosokawa, Tokyo (JP); Norikazu Miyazaki, Tokyo (JP)

(73) Assignee: SUMITOMO OSAKA CEMENT CO., LTD., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/515,671

(22) PCT Filed: Mar. 31, 2016

(86) PCT No.: PCT/JP2016/060595
§ 371 (c)(1),
(2) Date: Mar. 30, 2017

(87) PCT Pub. No.: WO2016/159202
PCT Pub. Date: Oct. 6, 2016

(65) Prior Publication Data
US 2018/0039104 A1 Feb. 8, 2018

(30) Foreign Application Priority Data
Mar. 31, 2015 (JP) .................. 2015-074091

(51) Int. Cl.
*G02F 1/03* (2006.01)
*G02F 1/225* (2006.01)
(Continued)

(52) U.S. Cl.
CPC ............ *G02F 1/0316* (2013.01); *G02F 1/035* (2013.01); *G02F 1/225* (2013.01); *G02F 1/2255* (2013.01);
(Continued)

(58) Field of Classification Search
None
See application file for complete search history.

(56) References Cited

U.S. PATENT DOCUMENTS 5,005,932 A * 4/1991 Schaffner ............ G02F 1/2255
359/279
5,563,965 A * 10/1996 Madabhushi ......... G02F 1/0356
385/2
(Continued)

FOREIGN PATENT DOCUMENTS

JP   H05249335 A   9/1993
JP   H10133237 A   5/1998
(Continued)

OTHER PUBLICATIONS

International Search Report of PCT/JP2016/060595 dated Jul. 5, 2016.

*Primary Examiner* — Michael Stahl
(74) *Attorney, Agent, or Firm* — Taft Stettinius & Hollister LLP

(57) ABSTRACT

Object
To provide an optical waveguide device capable of suppressing an excess optical loss at a low level.
Means
An optical waveguide device including a substrate having an electro-optic effect, an optical waveguide 1 formed on the substrate, and a control electrode having a signal electrode 2 and ground electrodes 3 and 4 for controlling light waves that propagate through the optical waveguide, in which the signal electrode 2 has, in an intersection portion in which the signal electrode 2 is disposed on the optical waveguide 1, a narrow portion at which a width of the signal electrode 2 is narrower than those of portions before and after the intersection portion.

6 Claims, 5 Drawing Sheets

(51) Int. Cl.
*G02F 1/035* (2006.01)
*G02F 1/21* (2006.01)
(52) U.S. Cl.
CPC .. *G02F 2001/212* (2013.01); *G02F 2201/122* (2013.01); *G02F 2202/20* (2013.01)

(56) References Cited

U.S. PATENT DOCUMENTS

| | | |
|---|---|---|
| 6,355,496 B2 | 3/2002 | Tsuruma |
| 7,319,800 B2 | 1/2008 | Aoki et al. |
| 2001/0046722 A1 | 11/2001 | Tsuruma |
| 2002/0054417 A1* | 5/2002 | Gopalakrishnan .... G02F 1/0316 359/248 |
| 2005/0039322 A1* | 2/2005 | Kondo .................... G02F 1/225 29/592.1 |
| 2005/0123242 A1 | 6/2005 | Walker et al. |
| 2007/0081766 A1 | 4/2007 | Aoki et al. |
| 2008/0193074 A1* | 8/2008 | Sugiyama ............. G02F 1/2255 385/8 |
| 2009/0290830 A1* | 11/2009 | Mitomi ................. G02F 1/0356 385/3 |
| 2011/0135241 A1* | 6/2011 | Shimizu ................ G02F 1/2255 385/2 |
| 2015/0277156 A1* | 10/2015 | Kondou ................ G02F 1/0356 385/2 |

FOREIGN PATENT DOCUMENTS

| | | |
|---|---|---|
| JP | H11271699 A | 10/1999 |
| JP | 2004163859 A | 6/2004 |
| JP | 2009181108 A | 8/2009 |
| JP | 4771451 B2 | 9/2011 |
| JP | 2013242592 A | 12/2013 |
| WO | WO2006107000 A1 | 10/2006 |

* cited by examiner

FLOW OF CURRENT →

OPTICAL WAVEGUIDE DEVICE

TECHNICAL FIELD

The present invention relates to an optical waveguide device and particularly to an optical waveguide device in which electrodes are formed near part of optical waveguides.

BACKGROUND ART

In recent years, in the field of optical communication or optical measurement, optical waveguide devices such as waveguide-type optical modulators in which optical waveguides are formed on a substrate having an electro-optic effect and a control electrode for controlling light waves that propagate through the optical waveguides is formed are frequently used.

The control electrode in the above-described optical waveguide device has a structure in which a signal electrode is disposed so as to be put between ground electrodes, and, regarding the shape thereof, a variety of inventions have been proposed (for example, refer to Patent Literature 1 and 2).

CITATION LIST

Patent Literature

[Patent Literature No. 1] Japanese Unexamined Patent Application Publication No. 2013-242592
[Patent Literature No. 2] Japanese Patent No. 4771451

SUMMARY OF INVENTION

Technical Problem

For example, in an X-cut lithium niobate (LN) optical modulator in which a signal electrode is formed on a substrate having optical waveguides formed thereon, the limitation on the wiring of the signal electrode creates a necessity of partially intersecting the signal electrode and the optical waveguides, and thus places in which the signal electrode is disposed so as to cross the optical waveguide are locally generated.

FIG. 1 is a view illustrating an example of a place in which a signal electrode intersects with an optical waveguide in an optical waveguide device of the related art. In the FIG. 1, a signal electrode 2 having a uniform width which is put between two ground electrodes 3 and 4 is disposed so as to cross the optical waveguide 1.

In a case in which the control electrode is directly formed on a substrate having an electro-optic effect, the control electrode is directly formed on optical waveguides in places in which the control electrode intersects with the optical waveguides. The control electrode is made of a metallic material such as gold, but the metallic material has a complex index of refraction at wavelengths of light. Therefore, the control electrode acts as a clad having a complex index of refraction with respect to waveguides and thus absorbs light that propagates through the optical waveguides and an excess optical loss is caused.

Particularly, in the case of an MZ integration-type optical waveguide device including a plurality of Mach-Zehnder (MZ) optical waveguides, there are many places in which the signal electrode is disposed on the optical waveguides, and the area in which the optical waveguides overlap the signal electrode increases, and thus the excess optical loss further increases. Furthermore, in an MZ interferometer formed of MZ optical waveguides, in order to realize a high ON/OFF extinction ratio, it is necessary to adjust the optical loss based on an optical waveguide in which the excess optical loss is largest so that the optical powers of individual optical waveguides before being multiplexed become equal to each other, and thus there is a problem in that the excess optical loss in the element increases as a whole.

In order to prevent the above-described excess optical loss, means for providing a buffer layer such as dielectric $SiO_2$ on the substrate surface on which waveguides have been formed and forming the control electrode above the buffer layer is used. When the thickness of the buffer layer is set to 0.3 μm or more, more desirably 0.5 μm or more, it is possible to prevent the above-described excess optical loss. However, since the formation of the buffer layer decreases the electro-optic efficiency by electric fields in regions in which light waves that propagate through the optical waveguides are controlled using the control electrode, a problem of the drive voltage of the modulator increasing is caused. In addition, a method in which the buffer layer is formed only in places in which the signal electrode intersects with the optical waveguide can also be considered, but it is difficult to obtain favorable films using patterned buffer layers, and, additionally, the influence of uneven film stress attributed to patterning films causes another problem of the fluctuation of the bias points of optical waveguide devices and the like.

An object that the present invention attempts to achieve is to solve the above-described problems and provide an optical waveguide device capable of suppressing an excess optical loss at a low level while realizing a low drive voltage.

Solution to Problem

In order to achieve the above-described object, an optical waveguide device of the present invention has technical characteristics described below.

(1) An optical waveguide device including: a substrate having an electro-optic effect; an optical waveguide formed on the substrate; and a control electrode having a signal electrode and ground electrodes for controlling light waves that propagate through the optical waveguide, in which the signal electrode has, in an intersection portion in which the signal electrode is disposed on the optical waveguide, a narrow portion at which a width of the signal electrode is narrower than those of portions before and after the intersection portion.

(2) The optical waveguide device according to (1), in which an interval between the ground electrodes that put the narrow portion therebetween is substantially equal to an interval between the ground electrodes that put the signal electrode therebetween in the portions before and after the narrow portion.

(3) The optical waveguide device according to (1) or (2), in which a width of the narrow portion is 0.75 times or less widths of the portions before and after the intersection portion.

(4) The optical waveguide device according to any one of (1) to (3), in which a length of the narrow portion is 1.5 times or more mode field diameters of light waves that propagate through the optical waveguide.

(5) The optical waveguide device according to any one of (1) to (4), in which a width of the signal electrode gradually narrows toward the narrow portion.

(6) The optical waveguide device according to any one of (1) to (5), in which an angle at which a central line of the signal electrode and a central line of the optical waveguide intersect with each other in the intersection portion is 45 degrees or more and 90 degrees or less.

Advantageous Effects of Invention

In the present invention, since the signal electrode has, in the intersection portion in which the signal electrode is disposed on the optical waveguide, the narrow portion at which the width of the signal electrode is narrower than those of portions before and after the intersection portion, it is possible to suppress an excess optical loss lower while also realizing a low drive voltage.

DESCRIPTION OF EMBODIMENTS

Hereinafter, an optical waveguide device according to the present invention will be described in detail.

The optical waveguide device according to the present invention is an optical waveguide device including a substrate having an electro-optic effect, optical waveguides formed on the substrate, and a control electrode including a signal electrode and ground electrodes which are intended to control light waves that propagate through the optical waveguides, in which the signal electrode has, in intersection portions in which the signal electrode is disposed on the optical waveguide, narrow portions at which the width of the signal electrode is narrower than those of portions before and after the intersection portions.

For the substrate, for example, lithium niobate, tantalate niobate, lithium tantalate, lead lanthanum zirconate titanate (PLZT), silicon-based materials, and combinations thereof can be used. Particularly, lithium niobate or tantalate niobate having a strong electro-optic effect in X-cut substrates are preferably used.

The optical waveguides can be formed by, for example, diffusing Ti or the like on the substrate surface using a thermal diffusion method, a proton exchange method, or the like.

In addition, the control electrode can be formed, for example, by forming electrode patterns using Ti or Au or using a gold plating method or the like.

Figure 2:
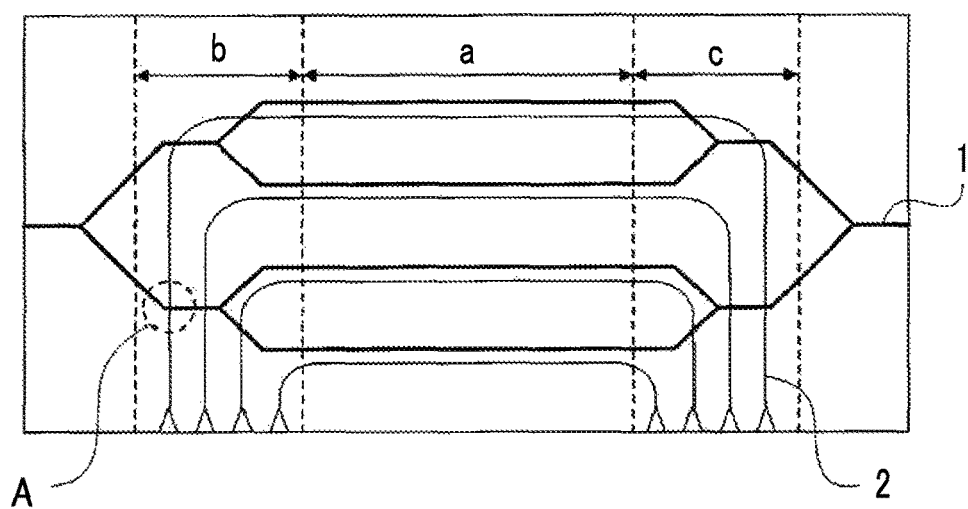
FIG. 2 is a view illustrating an example of a wiring structure in a substrate in an optical waveguide device according to the present invention.

FIG. 2 is a view illustrating an example of a wiring structure in the substrate of the optical waveguide device according to the present invention, four Mach-Zehnder optical waveguides are disposed in parallel, and light waves that propagate through the optical waveguides 1 are controlled by applying an electric field to the optical waveguides 1 using the signal electrode 2 constituting the control electrode in association with the ground electrodes not illustrated.

The signal electrode 2 can be classified into an action portion a for controlling light waves that propagate through the optical waveguides 1 and wiring portions b and c connected to the action portion a, and, in the wiring portions b and c, places in which the signal electrode 2 is disposed so as to cross the optical waveguide 1 (for example, an intersection portion at A in the drawing) are locally generated.

Figure 3:
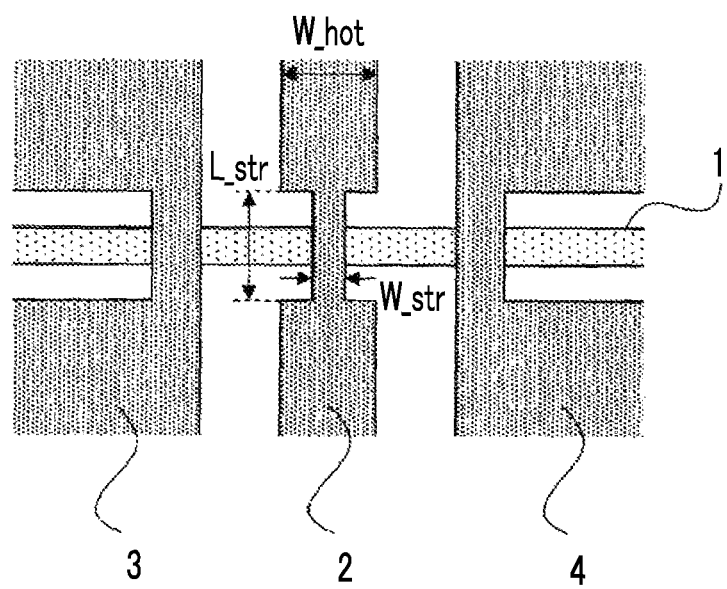
FIG. 3 is a view illustrating an example of a place in which a signal electrode intersects with an optical waveguide in an optical waveguide device according to the present invention.

FIG. 3 is a view illustrating an example of a place in which the signal electrode intersects with the optical waveguide in the optical waveguide device according to the present invention. In the same drawing, a structure is provided in which the width of the signal electrode 2 is sharply narrowed in the region in which the signal electrode intersects with the optical waveguide 1.

Figure 4:
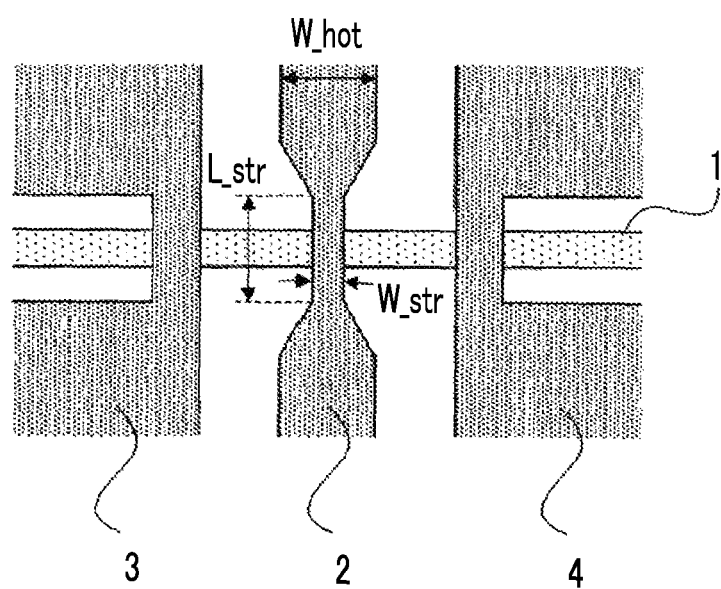
FIG. 4 is a view illustrating an example of the place in which the signal electrode intersects with the optical waveguide in the optical waveguide device according to the present invention.

FIG. 4 is a view illustrating another example of a place in which the signal electrode intersects with the optical waveguide in the optical waveguide device according to the present invention. In the same drawing, the width of the signal electrode 2 is continuously changed so as to gradually narrow toward the region in which the signal electrode intersects with the optical waveguide 1.

Figure 1:
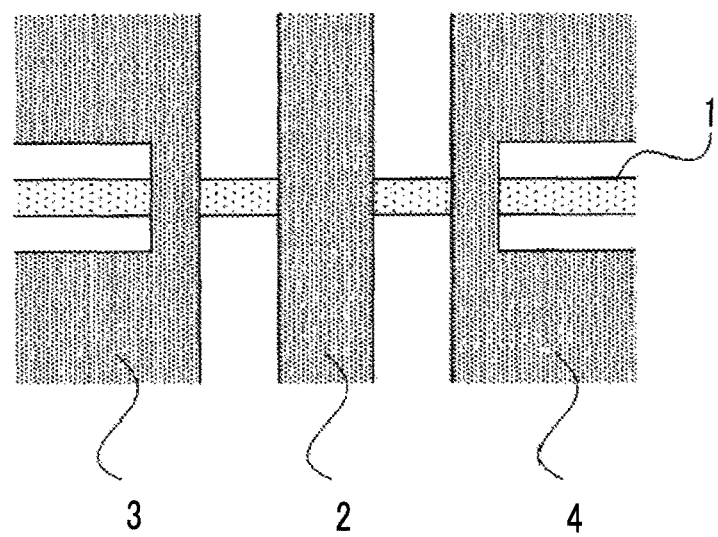
FIG. 1 is a view illustrating an example of a place in which a signal electrode intersects with an optical waveguide in an optical waveguide device of the related art.

In both FIGS. 3 and 4, the signal electrode 2 put between two ground electrodes 3 and 4 has, in the intersection portion that is disposed on the optical waveguide 1, a narrow portion at which the width of the signal electrode 2 is narrower than those of portions before and after the intersection portion. Therefore, the area of the signal electrode 2 that is disposed on the optical waveguide 1 becomes smaller than that in the related art (FIG. 1), and thus an excess optical loss caused by the influence of the signal electrode 2 is suppressed lower.

Particularly, in optical waveguide devices on which a plurality of Mach-Zehnder optical waveguides are integrated together, the number of intersection portions on which the signal electrode 2 is disposed on the optical waveguide 1 increases, and thus the effects of the present invention are significant.

Here, the intersection portion refers not only to a section in which the signal electrode 2 and the optical waveguide 1 actually intersect with each other (overlap each other) but also to sections around the above-described section (sections on which the signal electrode 2 has an influence on the excess optical loss in the optical waveguide 1). In FIGS. 3 and 4, a section of the signal electrode 2 having the length of L_str which center is the center of the optical waveguide 1 (a section having a slightly larger width than the optical waveguide 1) corresponds to the intersection portion between the signal electrode 2 and the optical waveguide 1.

In addition, the portions before and after the intersection portion refer to portions at which the width of the signal electrode 2 is the standard width W_hot of a wire in the signal electrode 2.

Furthermore, a narrow portion in which the width of the signal electrode 2 is set to be as narrower than those of the portions before and after the intersection portion as W_str (which is smaller than the standard width W_hot) is provided in the intersection portion.

Meanwhile, in the case of an discontinuous structure in which the width of the signal electrode 2 sharply changes as illustrated in FIG. 3, there is a concern that the reflection characteristics or propagation characteristics of high-frequency signals may deteriorate. Therefore, from the viewpoint of high-frequency characteristics, a taper shape in which the width of the signal electrode 2 gradually narrows as illustrated in FIG. 4 is preferred.

In addition, in FIGS. 3 and 4, the width of the signal electrode 2 linearly changes in the narrow portion and the portions before and after the narrow portion but may be changed in a curved manner. That is, for example, instead of the middle portion having a linear shape in FIG. 4, a middle portion which gradually narrows while forming a curved shape that can be continuously differentiated may be provided.

In addition, as illustrated in FIG. 4, the width of the signal electrode 2 may be changed in a curved manner from the place having the standard width W_hot of the signal electrode 2 up to the narrow portion without providing any sharp corners to the contour of the signal electrode 2.

Here, in the present example, in a case in which the control electrode (the signal electrode 2 and the ground electrodes 3 and 4) is intersected with the optical waveguide 1, a low drive voltage can be realized by providing a structure formed by directly overlaying the control electrode on the optical waveguide 1, but a constitution can also be considered in which a buffer layer such as dielectric $SiO_2$ is provided on the substrate surface on which the optical waveguide 1 has been formed and the control electrode is formed on the buffer layer. In this case, when the thickness of the buffer layer is set to 0.3 μm or less, and the present invention is applied, it is possible to suppress an increase of the drive voltage and suppress an excess optical loss lower. Meanwhile, the high-frequency characteristics of the control electrode vary depending on the presence or absence of the buffer layer and the thickness of the buffer layer, but the high-frequency characteristics can be optimized by, additionally, adjusting the thickness of the substrate having an electro-optic effect. Particularly, in a case in which the buffer layer is not provided or the thickness of the buffer layer is 0.3 μm or less, when the thickness of the substrate is set to 10 μm or less, the effective refractive index of the control electrode can be adjusted to the optimal value and a drive voltage drop effect attributed to the decreased substrate thickness can also be obtained at the same time.

In addition, as described above, the excess optical loss is caused only in a case in which the control electrode comes as close to the optical waveguide 1 as approximately a sub-micrometer order. Therefore, for example, an electrode shape may be provided in which the narrow portions are applied only to the lower portion of the signal electrode 2 in contact with the substrate or the buffer layer and the electrode width of the signal electrode 2 is wider in the upper portion than in the lower portion. In this case, as long as the narrow portions in which the electrode width of the signal electrode 2 in the lower portion is narrower than those of the portions before and after the intersection portion are provided in the structure, the effects of the present invention are provided. In addition, compared with a case in which the widths are identical both in the upper portion of the signal electrode 2 and in the lower portion of the signal electrode 2, the surface area of the signal electrode 2 is larger, the electric field density of electric signals becomes relatively coarse, and a high-frequency propagation loss decreases, and thus, in addition to the effects of the present invention, the constitution is also advantageous in terms of the high-frequency characteristics.

Next, the requirements of the width and length of the narrow portion of the signal electrode 2 will be described.

Hereinafter, as the width and length of the narrow portion of the signal electrode 2, the width and length of a portion at which the width of the signal electrode 2 is narrowed and the width is substantially constant as indicated by W_str and L_str in FIGS. 3 and 4 are used. In addition, as the width of the portions before and after the narrow portion of the signal electrode 2, W_hot is used. Generally, W_hot is approximately 10 to 50 μm.

In order to decrease the excess optical loss, the narrow portions in the signal electrode 2 preferably have a narrow width and a long length; however, the deterioration of the high-frequency characteristic is concerned, and thus it is necessary to approximately set the width and length of the narrow portion.

Regarding the width of the narrow portion of the signal electrode 2, the narrower the width of the narrow portion, the more effective it is from the viewpoint of a decrease in the excess optical loss, and W_str/W_hot≤0.75 time, that is, the width W_str of the narrow portion being 0.75 times or less the standard width W_hot of the portions before and after the intersection portion is desirable. In addition, the width of the narrow portion of the signal electrode 2 is desirably 5 μm or more in terms of manufacturing.

The length of the narrow portion of the signal electrode 2 is desirably a length of λ/10=c/(10 nf) or less so as not to occur high-frequency influences. Here, c represents the light velocity, f represents the signal frequency, and n represents the effective refractive index of traveling wave electrode. In addition, when the light electric field distribution of light wave is assumed as the Gaussian distribution, 99.7% of light energy is included in a range of 1.5 times the mode field diameter of light waves that propagate through the optical waveguide 1, and thus the length of the narrow portion of the signal electrode 2 is desirably 1.5 times or more the mode field diameter.

Figure 8:
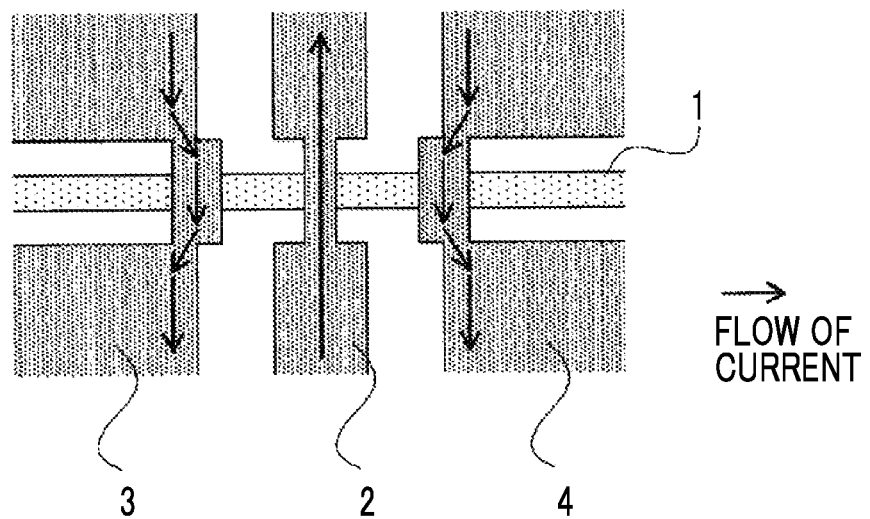
FIG. 8 is a view illustrating an example of the place in which the signal electrode intersects with the optical waveguide in the optical waveguide device according to the present invention.

In addition, a structure in which the interval between the ground electrodes 3 and 4 narrows in the narrow portion of the signal electrode 2 so that the interval between the ground electrode 3 and the signal electrode 2 or the interval between the ground electrode 4 and the signal electrode 2 becomes approximately constant as illustrated in FIG. 8 is desirable in terms of impedance matching. However, since it becomes difficult for the high-frequency GND currents of the ground electrode 4 to flow, there are cases in which the high-frequency characteristics deteriorate. In order to suppress this deterioration, a constitution in which the interval between the ground electrodes 3 and 4 is set to be approximately constant in the narrow portion of the signal electrode 2 and the portions before and after the narrow portion as illustrated in FIGS. 3 and 4 may be provided. When the above-described constitution is provided, a favorable high-frequency characteristic can be obtained, and it is possible to suppress manufacturing difficulties lower. Therefore, it can be said that a structure in which the interval between the ground electrodes 3 and 4 is set to be constant is preferable from the viewpoint of the suppression of manufacturing costs.

Next, the simulation results of the high-frequency characteristics of the optical waveguide device according to the present invention will be described.

Figure 5:
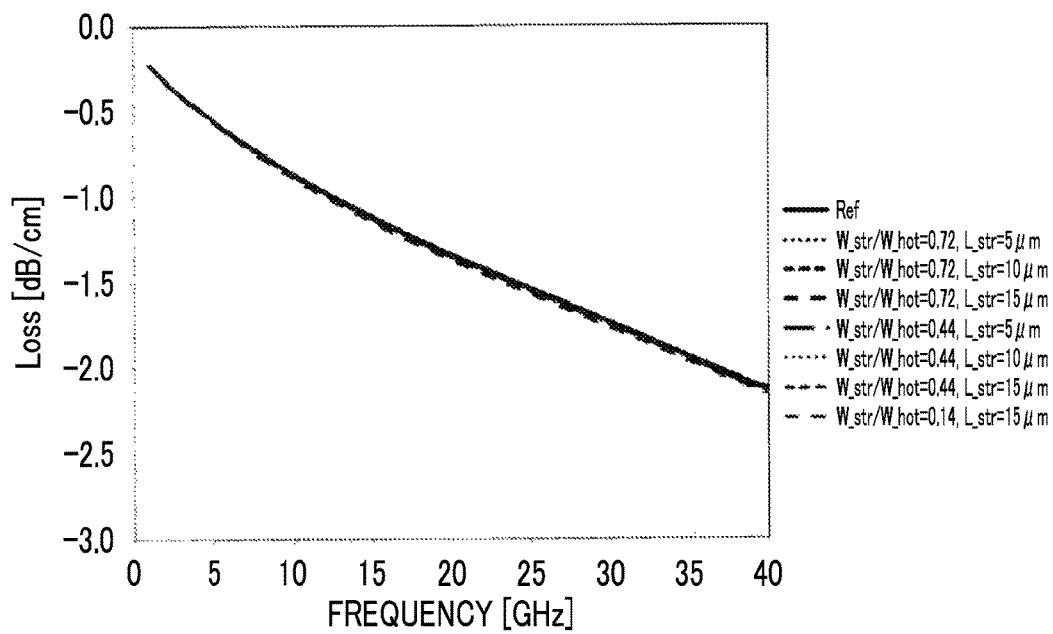
FIG. 5 is a view illustrating an example of a simulation result of propagation characteristics in the optical waveguide device according to the present invention.

FIG. 5 is a view illustrating an example of the simulation results of propagation characteristics. In addition, FIG. 6 is a view illustrating an example of the simulation results of reflection characteristics.

Here, for a case in which the width (W_hot) of the portions before and after the narrow portion of the signal electrode are set to 10 to 50 μm, propagation characteristics and reflection characteristics were computed using a three-dimensional electromagnetic field analysis simulator.

Figure 6:
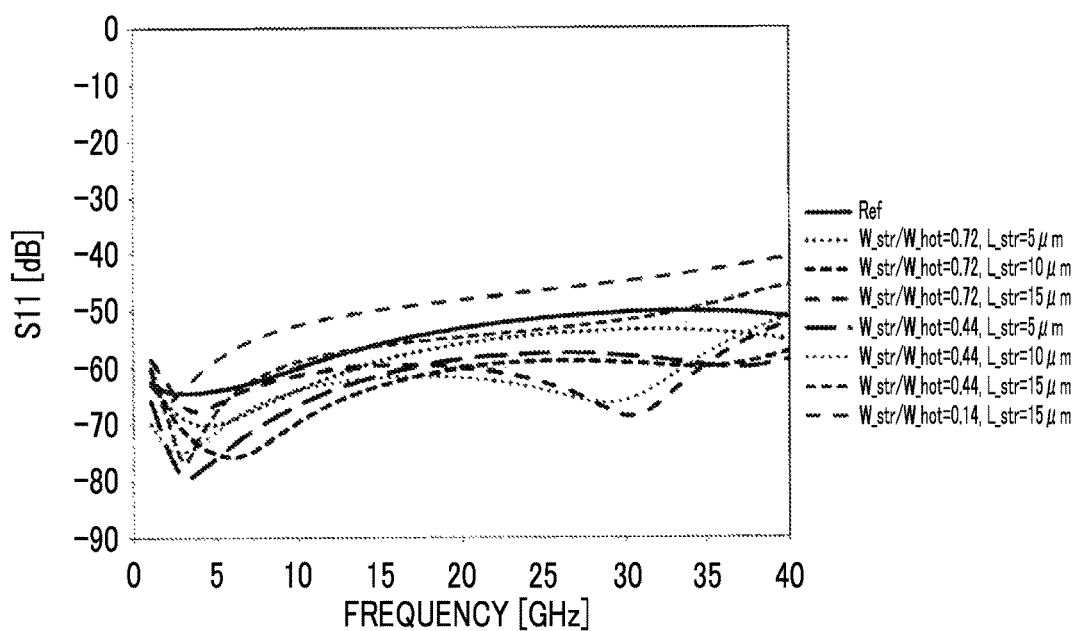
FIG. 6 is a view illustrating an example of a simulation result of reflection characteristics in the optical waveguide device according to the present invention.

FIGS. 5 and 6 illustrate the comparison between the simulation results of a case in which narrow portions satisfy (Condition 1) to (Condition 7) below are provided in the signal electrode 2 and the simulation results (Ref) of a case in which no narrow portions are provided in the signal electrode 2.

| | |
|---|---|
| $W\_str/W\_hot=0.72, L\_str=5$ μm | (Condition 1) |
| $W\_str/W\_hot=0.72, L\_str=10$ μm | (Condition 2) |
| $W\_str/W\_hot=0.72, L\_str=15$ μm | (Condition 3) |
| $W\_str/W\_hot=0.44, L\_str=5$ μm | (Condition 4) |
| $W\_str/W\_hot=0.44, L\_str=10$ μm | (Condition 5) |
| $W\_str/W\_hot=0.44, L\_str=15$ μm | (Condition 6) |
| $W\_str/W\_hot=0.14, L\_str=15$ μm | (Condition 7) |

As illustrated in FIG. 5, the propagation characteristics were approximately same for all of (Condition 1) to (Condition 7) and in a case in which no narrow portions are provided in the signal electrode 2. In addition, as illustrated in FIG. 6, the reflection characteristics somewhat fluctuate for all of (Condition 1) to (Condition 7) but no deterioration was observed compared with a case in which no narrow portions were provided in the signal electrode 2. Therefore, it is found that, in a range of W_str/W_hot=0.14 to 0.72 and L_str=5 to 15 μm, the high=frequency characteristics do not deteriorate and it becomes possible to suppress an excess optical loss lower.

In addition, as a result of the production and actual measurement of a test product of W_str/W_hot=0.44 and L_str=100 μm, it was possible to confirm that no deterioration was observed in the high-frequency characteristics.

Here, the above description describes an example of the structure in which the signal electrode 2 intersects with the optical waveguide 1 at right angles, but the signal electrode 2 may intersect with the optical waveguide 1 in an inclined manner in the structure.

Figure 7:
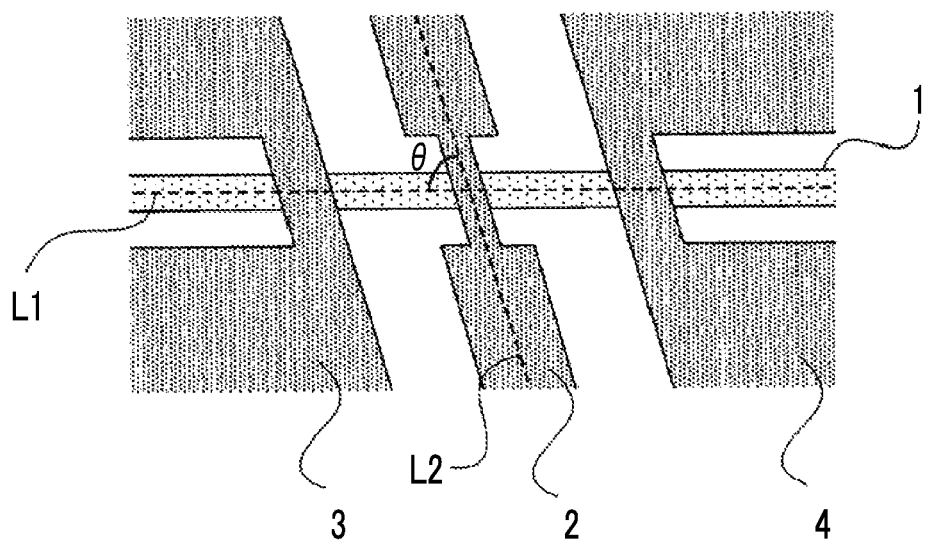
FIG. 7 is a view illustrating an example of the place in which the signal electrode intersects with the optical waveguide in the optical waveguide device according to the present invention.

FIG. 7 is a view illustrating another example of the intersection portion between the signal electrode and the optical waveguide in the optical waveguide device according to the present invention. In the same drawing, the signal electrode 2 intersects with the optical waveguide 1 at an angle θ, and, even in this case, it is possible to suppress an excess optical loss.

However, when the signal electrode 2 intersects with the optical waveguide 1 at an acute angle, the area of the intersection portion increases, and the excess optical loss increases. Therefore, the angle θ at which the central line L1 of the optical waveguide 1 intersects with the central line L2 of the signal electrode 2 in the intersection portion is preferably 45 degrees or more and 90 degrees or less from the viewpoint of the suppression of the excess optical loss.

Figure 9:
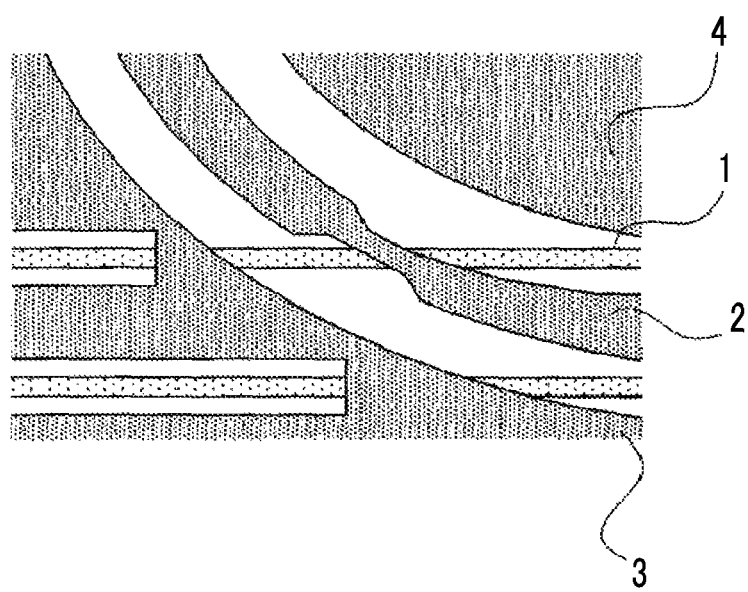
FIG. 9 is a view illustrating an example of the place in which the signal electrode intersects with the optical waveguide in the optical waveguide device according to the present invention.

In addition, in order to ensure high-frequency characteristics, the bent portion of the signal electrode 2 desirably has an arc shape. In the case of the arc-bent portion of the signal electrode 2 as illustrated in FIG. 9, however the overlapping area between the signal electrode 2 and the optical waveguide 1 becomes larger than that in a case in which the signal electrode 2 intersects with the optical waveguide 1 at right angles, therefore the effect of the application of the present invention is strong.

INDUSTRIAL APPLICABILITY

As described above, according to the present invention, it is possible to provide an optical waveguide device capable of suppressing an excess optical loss at a low level.

REFERENCE SIGNS LIST

1: optical waveguide
2: signal electrode
3, 4: ground electrode
The invention claimed is:
1. An optical waveguide device comprising:
a substrate having an electro-optic effect;
an optical waveguide having a plurality of Mach-Zehnder optical waveguides formed on the substrate; and
a control electrode having signal electrodes and ground electrodes for controlling light waves that propagate through the optical waveguide,
wherein the signal electrodes are respectively provided for the Mach-Zehnder optical waveguides,
each signal electrode is classified into an action portion for controlling the light waves and wiring portions connected to the action portion, and
the wiring portion has, in an intersection portion in which the wiring portion is disposed on the optical waveguide, a narrow portion at which a width of the wiring portion is narrower than those of wiring portions before and after the intersection portion.
2. The optical waveguide device according to claim 1, wherein an interval between the ground electrodes that put the narrow portion therebetween is substantially equal to an interval between the ground electrodes that put the wiring portion therebetween in the portions before and after the narrow portion.
3. The optical waveguide device according to claim 1, wherein a width of the narrow portion is 0.75 times or less widths of the wiring portions before and after the intersection portion.
4. The optical waveguide device according to claim 1, wherein a length of the narrow portion is 1.5 times or more mode field diameters of light waves that propagate through the optical waveguide.
5. The optical waveguide device according to claim 1, wherein a width of the wiring portion gradually narrows toward the narrow portion.
6. The optical waveguide device according to claim 1, wherein an angle at which a central line of the wiring portion and a central line of the optical waveguide intersect with each other in the intersection portion is 45 degrees or more and 90 degrees or less.

* * * * *